United States Patent
Fukawatase

(10) Patent No.: US 9,434,344 B2
(45) Date of Patent: Sep. 6, 2016

(54) FRONT PASSENGER SEAT AIRBAG DEVICE

(71) Applicant: Toyota Jidosha Kabushiki Kaisha, Toyota-shi, Aichi-ken (JP)

(72) Inventor: Osamu Fukawatase, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/795,120

(22) Filed: Jul. 9, 2015

(65) Prior Publication Data
US 2016/0009242 A1    Jan. 14, 2016

(30) Foreign Application Priority Data
Jul. 11, 2014    (JP) ................. 2014-143685

(51) Int. Cl.
*B60R 21/231* (2011.01)
*B60R 21/2338* (2011.01)
*B60R 21/233* (2006.01)

(52) U.S. Cl.
CPC ......... *B60R 21/231* (2013.01); *B60R 21/2338* (2013.01); *B60R 2021/23107* (2013.01); *B60R 2021/23316* (2013.01); *B60R 2021/23382* (2013.01)

(58) Field of Classification Search
CPC .............. B60R 21/231; B60R 21/268; B60R 2021/23107
See application file for complete search history.

(56) References Cited

U.S. PATENT DOCUMENTS

| | | | |
|---|---|---|---|
| 2014/0361521 A1* | 12/2014 | Fukawatase | B60R 21/231 280/730.1 |
| 2015/0166002 A1* | 6/2015 | Fukawatase | B60R 21/233 280/730.1 |
| 2015/0343986 A1* | 12/2015 | Schneider | B60R 21/205 280/729 |
| 2015/0367802 A1* | 12/2015 | Fukawatase | B60R 21/205 280/732 |
| 2016/0039385 A1* | 2/2016 | Watamori | B60R 21/23138 280/730.1 |

FOREIGN PATENT DOCUMENTS

| | | |
|---|---|---|
| JP | H06-24282 A | 2/1994 |
| JP | H06-72276 A | 3/1994 |
| JP | 2012-056371 A | 3/2012 |
| JP | 2015-113027 | 6/2015 |

* cited by examiner

*Primary Examiner* — Drew Brown
(74) *Attorney, Agent, or Firm* — Dinsmore & Shohl LLP

(57) ABSTRACT

There is provided a front passenger seat airbag device including a front passenger seat airbag that receives a supply of gas and inflates and deploys in front of a front passenger seat, and that is formed with a vehicle rear-facing first head contact face at a vehicle up-down direction upper portion in an inflated and deployed state, and a center airbag that is integrally formed to the front passenger seat airbag, that receives a supply of gas and inflates and deploys on a vehicle width direction center side of the front passenger seat airbag, and that is formed in an inflated and deployed state with a second head contact face extending from a vehicle width direction center side end portion of the first head contact face toward the vehicle rear, and facing both the vehicle rear and the vehicle width direction outside.

13 Claims, 8 Drawing Sheets

FRONT PASSENGER SEAT AIRBAG DEVICE

CROSS-REFERENCE TO RELATED APPLICATION

This application claims priority under 35 USC 119 from Japanese Patent application No. 2014-143685 filed on Jul. 11, 2014, the disclosure of which is incorporated by reference herein.

BACKGROUND

1. Technical Field

The present disclosure relates to a front passenger seat airbag device.

2. Related Art

Known front passenger seat airbag devices include a device in which a pair of extension portions extend out toward the vehicle rear side from locations of a pair of inflation portions at a height corresponding to the head or shoulder region of an occupant (see, for example, Japanese Patent Application Laid-Open (JP-A) No. 2012-56371). Airbag devices for front seats that seat three people are also known (see, for example, JP-A Nos. H06-72276 and H06-24282).

The configuration of JP-A No. 2012-56371 is capable of restraining an occupant of the front passenger seat moving toward a collision side obliquely toward the front in the event of an oblique collision on a driving seat side.

Note that there are concerns of the head of the occupant rotating about an axis running in the up-down direction when the head contacts the airbag when moving obliquely forward in an oblique vehicle collision.

SUMMARY

The present disclosure obtains a front passenger seat airbag device capable of suppressing rotation of the head of an occupant of a front passenger seat during restraint of the occupant in an oblique collision or a small overlap collision to a driving seat side.

A first aspect of the present disclosure is a front passenger seat airbag device including a front passenger seat airbag that receives a supply of gas and inflates and deploys in front of a front passenger seat, and that is formed with a vehicle rear-facing first head contact face at a vehicle up-down direction upper portion in an inflated and deployed state, and a center airbag that is integrally formed with the front passenger seat airbag, that receives a supply of gas and inflates and deploys on a vehicle width direction center side of the front passenger seat airbag, and that is formed in an inflated and deployed state with a second head contact face extending from a vehicle width direction center side end portion of the first head contact face toward the vehicle rear, and facing both the vehicle rear and the vehicle width direction outside.

In the front passenger seat airbag device according to the first aspect, the front passenger seat airbag and the center airbag receive the supply of gas and inflate and deploy in the event of, for example, an oblique collision or a small overlap collision. The front passenger seat airbag inflates and deploys in front of the front passenger seat (occupant), and the center airbag inflates and deploys at the vehicle width direction center side (driving seat side) of the front passenger seat airbag. An occupant of the front passenger seat moving obliquely toward the front toward the collision side (driving seat side) is accordingly restrained by the front passenger seat airbag and the center airbag in the event of an oblique collision or a small overlap collision to the driving seat side.

Note that the head of the occupant moving obliquely toward the front as described above mainly contacts the second head contact face of the center airbag, and is restrained by the front passenger seat airbag and the center airbag. The second head contact face deploys in a shape facing both the vehicle rear and the vehicle width direction outside, thereby making contact so as to surround the head of the occupant moving toward the front from the front and from the collision side in the vehicle width direction. Rotation of the head of the occupant is thereby better suppressed than in a configuration in which the head of the occupant is only contacted at the front, or at the collision side in the vehicle width direction.

The configuration of the first aspect accordingly enables rotation of the head of the occupant to be suppressed during restraint of the occupant of the front passenger seat in an oblique collision or a small overlap collision to the driving seat side.

A front passenger seat airbag device according to a second aspect of the present disclosure is the first aspect, wherein the second head contact face has an arc shape forming a recess that is open toward the side of the head of an occupant of the front passenger seat in plan view.

In the front passenger seat airbag device of the second aspect, the second head contact face configures a recess open toward the side of the head of the occupant, thereby facilitating contact such that the second head contact face surrounds the head of the occupant from the front side and the collision side in the vehicle width direction.

A front passenger seat airbag device according to a third aspect of the present disclosure is the first aspect, wherein the second head contact face is formed in the inflated and deployed state of the center airbag, by connecting a plan view central portion of a base cloth at a portion forming the second head contact face with a portion of the center airbag further to the front side than the central portion, using a tension member.

In the front passenger seat airbag device of the third aspect, the second head contact face configures a recess open toward the side of the head of the occupant, thereby facilitating contact such that the second head contact face surrounds the head of the occupant from the front side and the collision side in the vehicle width direction. The deployed shape of the second head contact face is moreover ensured by the strap.

A front passenger seat airbag device according to a fourth aspect of the present disclosure is of any one of the first aspect to the third aspect, wherein the front passenger seat airbag and the center airbag are formed with an upper body contact face that is positioned further to the vehicle front than the second head contact face in the inflated and deployed state and that contacts at least the shoulder region of an occupant of the front passenger seat.

In the front passenger seat airbag device of the fourth aspect, the upper body contact face is positioned to the vehicle front of the second head contact face when the front passenger seat airbag and the center airbag are in the inflated and deployed state. This thereby enables the head and the shoulder region of the occupant moving obliquely toward the front toward the collision side to (start to) be restrained by the second head contact face and the upper body contact face at the same time as, or within a small space of time, of each other in the event of an oblique collision or a small overlap collision to the driving seat side.

As described above, the front passenger seat airbag device according to the present disclosure is capable of suppressing rotation of the head of an occupant of a front passenger seat during restraint of the occupant in an oblique collision or a small overlap collision to a driving seat side.

BRIEF DESCRIPTION OF THE DRAWINGS

Exemplary embodiments of the present disclosure will be described in detail based in the following figures, wherein.

DETAILED DESCRIPTION

Explanation follows regarding a front passenger seat airbag device 10 according to an exemplary embodiment of the present disclosure, with reference to FIG. 1 to FIG. 7B. Note that the arrow FR, the arrow UP, and the arrow RH, shown as appropriate in each of the drawings, respectively indicate the front direction, upward direction, and the right side, this being one side in the vehicle width direction, of a vehicle V applied with the front passenger seat airbag device 10 (see FIG. 2). In the following explanation, unless specifically indicated otherwise, reference simply to the front-rear, up-down, and left-right directions refers to the front and rear in the vehicle front-rear direction, up and down in the vehicle up-down direction, and the left and right of the vehicle (when facing forward).

Schematic Configuration of the Vehicle V Interior

Figure 1:
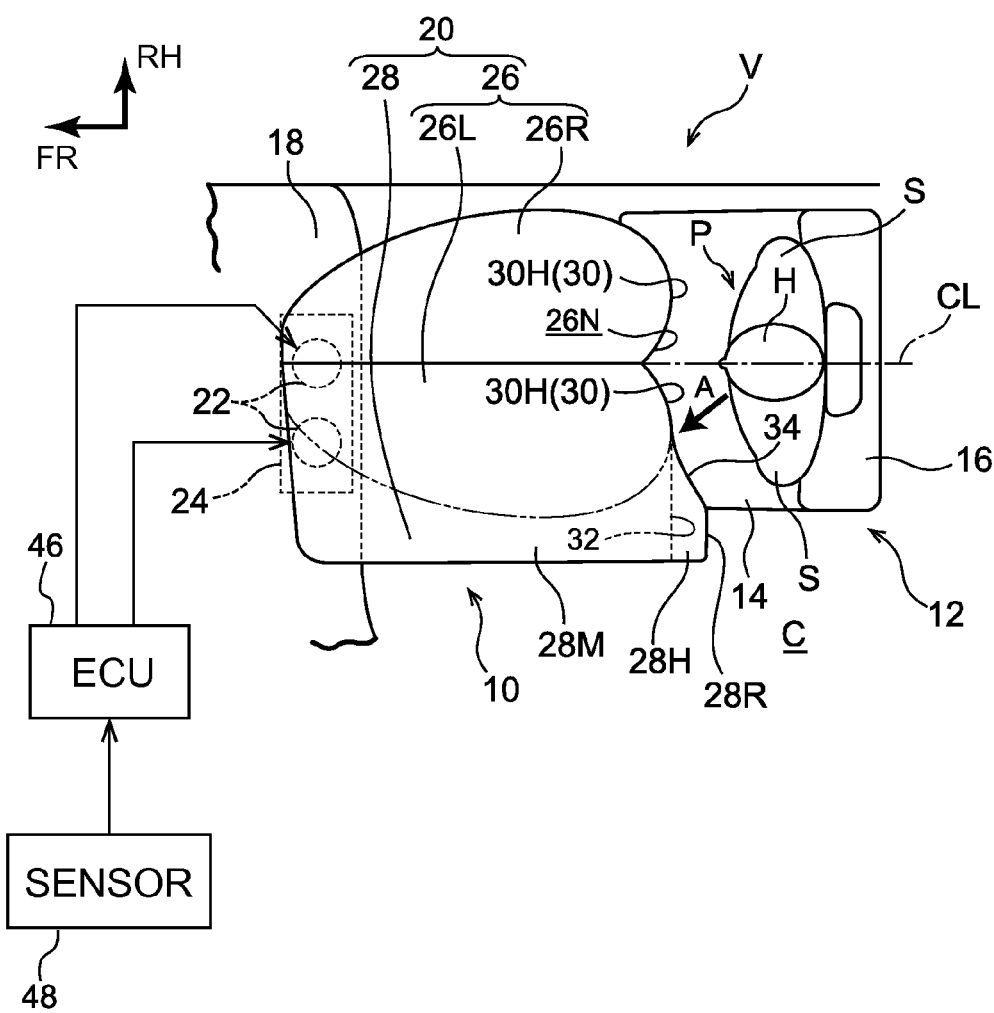
FIG. 1 is a plan view illustrating a schematic overall configuration of a front passenger seat airbag device according to a first exemplary embodiment.

FIG. 1 is a plan view schematically illustrating part of a front section inside a cabin C of the vehicle V applied with the front passenger seat airbag device 10. Note that a front passenger seat airbag 26 and a center airbag 28, described later, are illustrated in an inflated and deployed state in FIG. 1. As illustrated in FIG. 1, a vehicle seat 12, this being a front passenger seat, is disposed inside the cabin C. The vehicle seat 12 is configured including a seat cushion 14 and a seatback 16, of which a lower end is connected to a rear end of the seat cushion 14.

In the present exemplary embodiment, the vehicle seat 12 is disposed on the right side of the vehicle width direction center of the vehicle V. Although not illustrated in the drawings, a vehicle seat, this being a driving seat, is disposed on the left side of the vehicle width direction center of the vehicle V, and a center console is installed between the driving seat and the front passenger seat. Namely, in the vehicle V applied with the front passenger seat airbag device 10 of the present exemplary embodiment, there is no middle seat provided between the driving seat and the front passenger seat. Note that configuration may be made without the center console (such as a configuration enabling a passageway between the left and right vehicle seats 12).

A front end of the center console mentioned above is joined to a vehicle width direction central portion of an instrument panel 18 extending in the vehicle width direction in front of the vehicle seat 12. Although not illustrated in the drawings, the vehicle seat 12 is provided with a seatbelt device for occupant restraint. The seatbelt device is what is referred to as a three-point seatbelt device. The waist of a passenger P occupying the vehicle seat 12 (referred to below as the "passenger P") is accordingly restrained by a lap belt, and the upper body of the passenger P is restrained by a shoulder belt.

Figure 2:
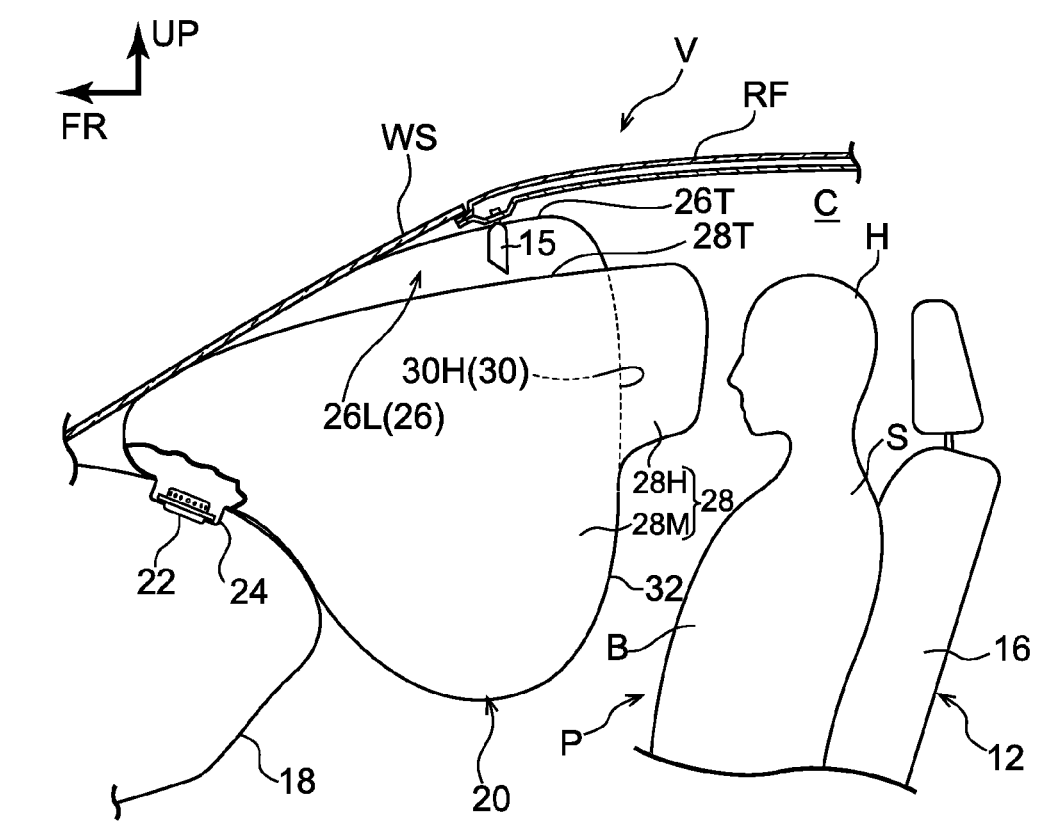
FIG. 2 is side view illustrating a front passenger seat airbag device according to the first exemplary embodiment, as viewed from the side of a driving seat.

As illustrated in FIG. 2, a rear-view mirror 15 is provided inside the cabin C, above and in front of the vehicle seat 12. The rear-view mirror 15 is installed at a vehicle width direction central portion of an upper section of a windshield WS, or of a front end of a roof RF.

General Configuration of the Front Passenger Seat Airbag Device

As illustrated in FIG. 1 and FIG. 2, the front passenger seat airbag device 10 is provided inside the instrument panel 18 in front of the vehicle seat 12. The front passenger seat airbag device 10 includes an airbag 20, inflators 22 serving as a gas supply means, and an airbag case (module case) 24. The airbag 20 includes the front passenger seat airbag 26 and the center airbag 28, described later. Note that two of the inflators 22 are provided in the present exemplary embodiment.

The airbag 20 is folded up and housed inside the airbag case 24 together with the inflators 22 in a built-in state of the inflators 22 to a base end portion of the airbag 20 (a front lower end portion in the inflated and deployed state). The airbag case 24, configuring a module with the airbag 20 and the inflators 22, is supported inside the instrument panel 18 by instrument panel reinforcement or the like, not illustrated in the drawings. Namely, the entire front passenger seat airbag device 10 is disposed inside the instrument panel 18. Note that although not illustrated in the drawings, an airbag door is formed to the instrument panel 18 at a portion covering the airbag case 24.

The front passenger seat airbag device 10 is configured such that when an airbag ECU 46, described below, actuates the inflators 22, the airbag 20 receives a supply of gas generated by the inflators 22 and inflates and deploys. The airbag 20 splits open the airbag door (the instrument panel 18) accompanying inflation and deployment, and inflates and deploys to the vehicle seat 12 side of the instrument panel 18.

The front passenger seat airbag device 10 includes the airbag ECU 46, serving as a controller. The airbag ECU 46 is electrically connected to a collision sensor (or a set of sensors) 48. The airbag ECU 46 is also electrically connected to each of the two inflators 22. The airbag ECU 46 is capable of detecting or predicting the occurrence, or inevitability of, various frontal collisions to the vehicle V to which it is installed, without discriminating between collision modes (or alternatively, for respective collision modes), based on a signal from the collision sensor 48.

The airbag ECU 46 actuates each of the inflators 22 at substantially the same time as each other when a frontal collision has been detected or predicted based on data from the collision sensor 48. Frontal collision modes in which the airbag ECU 46 actuates the inflators 22 include frontal collisions at positions offset to one side in the vehicle width direction, such as oblique collisions and small overlap collisions.

Note that an oblique collision (oblique MDB collision) is, for example, a collision occurring in an oblique frontal direction (for example, a collision at a relative angle of 15° with respect to the collision counterpart, with a vehicle width direction overlap amount of approximately 35%), as defined by NHSTA. In the present exemplary embodiment, as an example, an oblique collision at a relative speed of 90 km/hr is envisaged. A small overlap collision is a frontal collision of the vehicle V in which, for example, the vehicle width direction overlap amount with the collision counterpart is 25% or less, as defined by IIHS. For example, a collision on the vehicle width direction outside of a front side member, this being a vehicle body frame, corresponds to a small overlap collision. In the present exemplary embodiment, as an example, a small overlap collision at a relative speed of 64 km/hr is envisaged.

Relevant Configuration of Front Passenger Seat Airbag Device

Next, explanation follows regarding the shape of the airbag 20 configuring the front passenger seat airbag device when inflated and deployed. Note that explanation is given regarding the inflated and deployed shape of the airbag 20 during non-restraint, this being a state in which the airbag 20 is not in contact with the passenger P (is not restraining the passenger P). Out of the front passenger seat airbag 26 and the center airbag 28 configuring the airbag 20, explanation is first given regarding the front passenger seat airbag 26, followed by explanation regarding the center airbag 28.

Inflated and Deployed Shape of the Front Passenger Seat Airbag

As illustrated in FIG. 1, the front passenger seat airbag 26 includes a left bag 26L and a right bag 26R, and is configured so as to inflate and deploy in a substantially left-right symmetrical shape in plan view. A boundary line between the left bag 26L and the right bag 26R is substantially aligned with a center line CL of the vehicle seat 12 in the seat width (vehicle width) direction. Note that the intermittent line in FIG. 1 illustrates the inflated and deployed shape of the left bag 26L when not formed with the center airbag 28. The front passenger seat airbag 26 is what is referred to as a twin chamber type airbag.

In the inflated and deployed state, a rear end of the left bag 26L is positioned in front of the left shoulder of the passenger P, and a rear end of the right bag 26R is positioned in front of the right shoulder of the passenger P. A nook 26N formed between the rear ends of the left bag 26L and the right bag 26R is positioned in front of the head of the passenger P.

Figure 3A:
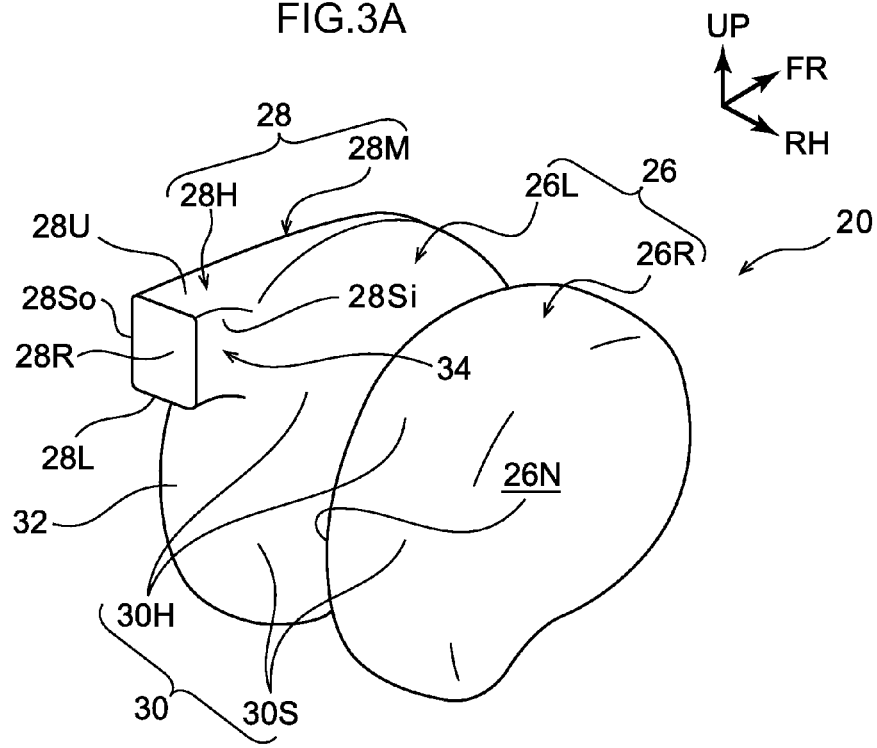
FIG. 3A is a perspective view illustrating an airbag configuring a front passenger seat airbag device according to the first exemplary embodiment.

As illustrated in FIG. 3A, rear faces of the left bag 26L and the right bag 26R of the front passenger seat airbag 26 described above (portions on both sides of the nook 26N in the vehicle width direction) form an occupant contact face 30 contacted by the passenger P. Portions of the occupant contact face 30 that contact the upper body of the passenger P, including at a shoulder region S, from substantially central portions downward in the up-down direction of the left bag 26L and the right bag 26R, configure an upper body contact face 30S. In the present exemplary embodiment, the upper body contact face 30S restrains the shoulder region S and a chest region B of the passenger P. Portions of the occupant contact face 30 that contact the head H of the passenger P, at upper portions of the left bag 26L and the right bag 26R, configure a head contact face 30H serving as a first head contact face.

Center Airbag

The center airbag 28 is integrally formed to the front passenger seat airbag 26, and is housed folded up inside the airbag case 24 together with the front passenger seat airbag 26 (not illustrated in the drawings). The center airbag 28 is configured so as to inflate and deploy on the vehicle width direction center side of the front passenger seat airbag 26, namely on the driving seat side, adjacent to the front passenger seat airbag 26. In the present exemplary embodiment, the front passenger seat airbag 26 and the center airbag 28 are configured by a single bag body, and there is no clear boundary between the front passenger seat airbag 26 (left bag 26L) and the center airbag 28 in the airbag 20.

The center airbag 28 is formed in a rectangular shape with its length running from front to rear in plan view, and a rear wall 28R, configuring a rear end of the center airbag 28, projects out further to the rear than the occupant contact face 30 of the front passenger seat airbag 26. Moreover, as illustrated in FIG. 2 and FIG. 3A, the center airbag 28 includes a main body portion 28M with a shape resembling that of the front passenger seat airbag 26 in side view, and a head restraint portion 28H projecting out from an upper rear end of the main body portion 28M. As described in more detail below, the rear wall 28R of the center airbag 28 doubles as a rear end of the head restraint portion 28H.

The front-rear direction position of an upper body contact face 32, configured by a rear end face of the main body portion 28M is substantially aligned with the front-rear direction position of the occupant contact face 30 of the front passenger seat airbag 26. The upper body contact face 32 of the main body portion 28M contacts the upper body of the passenger P, including the shoulder region S. In the present exemplary embodiment, the upper body contact face 32 restrains the shoulder region S and the chest region B of the passenger P. An upper end of the main body portion 28M, namely an upper end 28T of the center airbag 28, is set lower than an upper end 26T of the front passenger seat airbag 26. Specifically, the center airbag 28 is configured so as not to interfere with the rear-view mirror 15.

Figure 4:
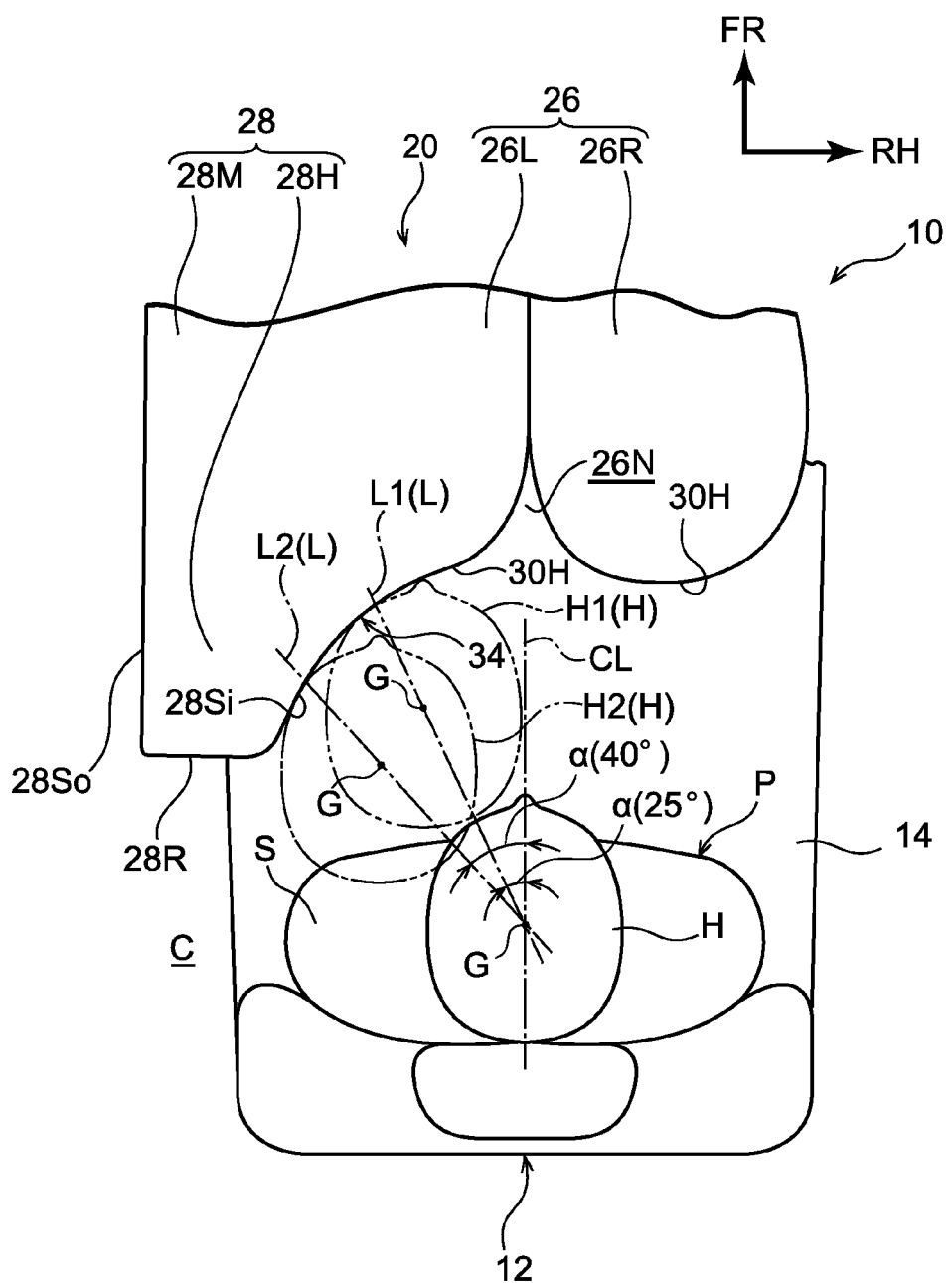
FIG. 4 is an enlarged schematic plan view of a front passenger seat airbag device according to the first exemplary embodiment, to explain movement angles of an occupant at which a head contact face of a center airbag is capable of contacting the head of the occupant.

As illustrated in FIG. 4, the head restraint portion 28H includes a head contact face 34 serving as a second head contact face facing the passenger P of the vehicle seat 12. A vehicle width direction outside portion at a front end of the head contact face 34 is contiguous to the head contact face 30H formed by the left bag 26L of the front passenger seat airbag 26, and a rear end of the head contact face 34 reaches the rear wall 28R configuring the rear end of the center airbag 28. Namely, the head contact face 34 extends toward the vehicle rear from an end portion at a vehicle width direction center side of the head contact face 30H.

The head contact face 34 has a shape facing toward both the rear and the vehicle seat 12 side (the vehicle width direction outside) in plan view. Note that although not illustrated in the drawings, a face facing toward both the rear and the vehicle width direction outside in plan view is a face angled such that, in plan view, a normal line thereto is oriented in a direction such that, with respect to the front-rear direction and the vehicle width direction, a rear side thereof is positioned further to the vehicle width direction outside than a front side. If the head contact face is formed in a non-linear shape in plan view, then it is sufficient that in plan view, the direction of a normal line to a hypothetical straight line connecting two specific points about a central portion of the head contact face is angled such that, with respect to the front-rear direction and the vehicle width direction, a rear side thereof is positioned further to the vehicle width direction outside than a front side.

In the present exemplary embodiment, the head contact face 34 is configured in a circular arc shape forming a recess open toward the passenger P side in plan view. More specifically, in plan view the head contact face 34 is configured in a circular arc shape centered on the position of the center of gravity G of the head H of the passenger P when in a normal sitting posture. In other words, in plan view there is a substantially uniform distance from the center of gravity G to each part of the head contact face 34. The center of gravity G of the head H may, for example, be set as the center of gravity of the head of a crash test dummy seated in the vehicle seat 12 in a standard sitting posture as stipulated for the crash test method. The crash test dummy may, for example, be a 50th percentile American adult male (AM50) of World Side Impact Dummy (WorldSID).

The range for setting the head contact face 34 of the center airbag 28 is determined such that the head H of the passenger P contacts the head contact face 34 when a movement angle α (an angle with respect to the center line CL of the vehicle seat 12) of the passenger P is in a range of from 25° to 40°. The justification for this is explained below.

As described above, as defined by NHSTA, in an oblique collision of the vehicle V, the relative angle between the vehicle V and the collision counterpart is 15°. Based on this definition, in oblique collision testing of the vehicle V using a dummy, it is established that the movement angle α of the passenger P with respect to the vehicle body when restrained by a three-point seatbelt device (also referred to below as simply "movement angle α") is approximately 25°. Namely, the movement angle α of the passenger P is approximately 10° greater than the relative angle between the vehicle V and the collision counterpart (15°). Moreover in real-life oblique collisions of the vehicle V, sometimes a relative angle of 30° between the vehicle V and the collision counterpart is seen. In such cases, the movement angle α of the passenger P is approximately 40°. In consideration of real-life oblique collisions of the vehicle V, in the present exemplary embodiment, the placement range (range in the front-rear direction and the vehicle width direction) of the head contact face is set such that the head H of the passenger P contacts the head contact face 34 at movement angles α of the passenger P in a range of from 25° to 40°. Note that in FIG. 4, the head H is labelled H1 in the case of a movement angle α of the passenger P of 25°, and the head H is labelled H2 in the case of a movement angle α of the passenger P of 40°.

Note that contact of the head contact face 34 by the head H of the passenger P refers to the head H contacting (having the ability to contact) on both sides of a straight line L connecting the positions of the center of gravity G of the head H before and after movement. Accordingly, the head contact face 34 is also set at a specific range (for example, approximately half the width of the head H) at the outsides of a range between the straight line L1 for a movement angle α of 25° and the straight line L2 for a movement angle α of 40°, illustrated in FIG. 4. Moreover, the placement range of the head contact face 34 is set such that the head H of the passenger P does not contact the head contact face 34, or the width of any contact is below a specific width, when the passenger P moves straight toward the front in a full overlap frontal collision. Note that when the passenger P moves straight toward the front in a full overlap frontal collision, the head H of the passenger P mainly contacts the head contact face 30H (nook 26N) of the front passenger seat airbag 26.

Figure 6A:
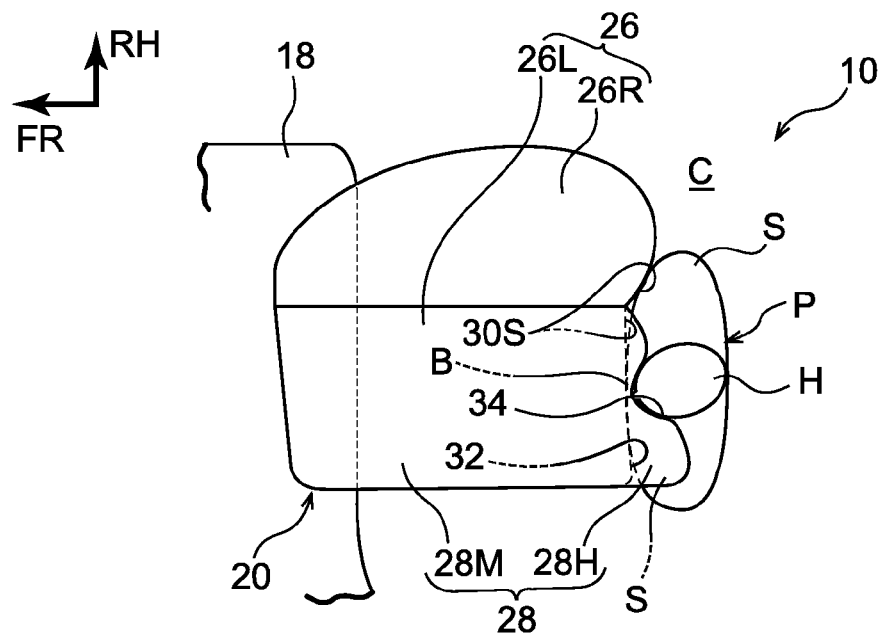
FIG. 6A is a plan view illustrating a restrained state of an occupant by a front passenger seat airbag device according to the first exemplary embodiment.
Figure 6B:
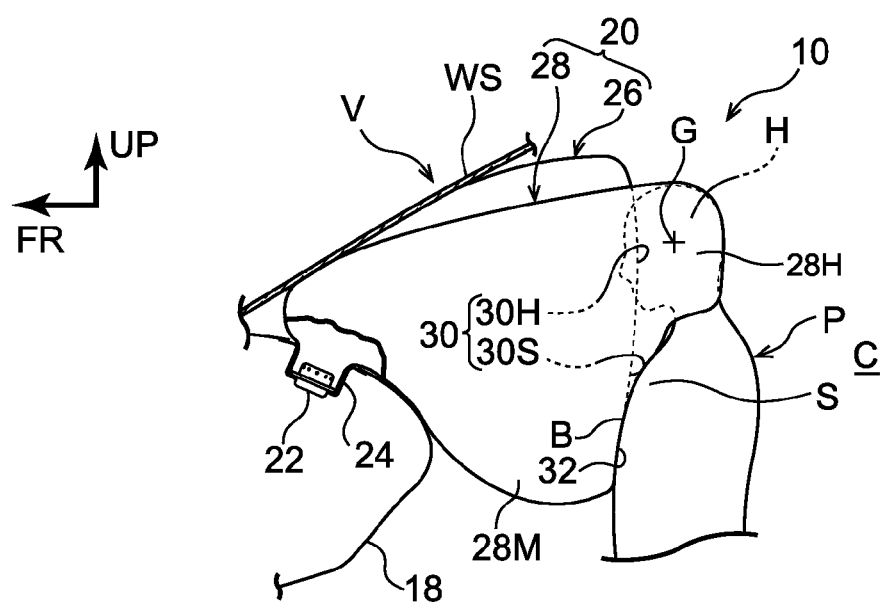
FIG. 6B is a side view illustrating a restrained state of an occupant by a front passenger seat airbag device according to the first exemplary embodiment, as viewed from the side of a driving seat.

In the up-down direction, the range for setting the head restraint portion 28H, including the head contact face 34, is set as a range in which the head H of the passenger P overlaps with the head contact face 34 when the head H has moved in a collision (an oblique collision or a small overlap collision) (see FIG. 6B). For example, configuration is made such that at least the center of gravity G of the head H of an AM50 dummy overlaps with the head contact face 34 after moving due to a collision. In the present exemplary embodiment, configuration is made such that in addition to the AM50 dummy, the center of gravity G of the head H of an AF05 dummy (5th percentile American adult female) also overlaps with the head contact face 34 after moving due to a collision.

Figure 3B:
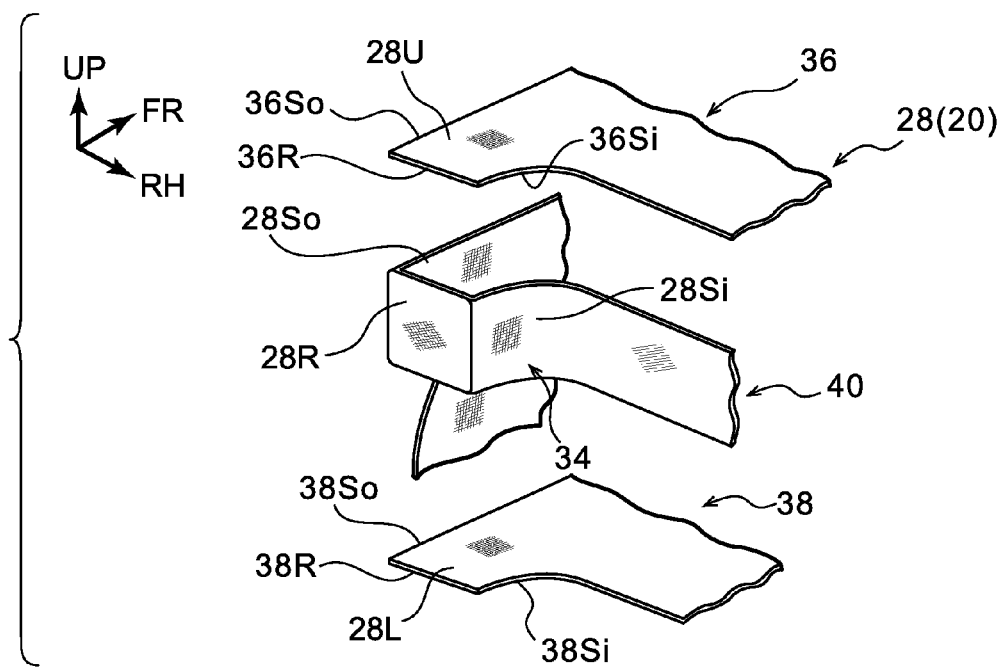
FIG. 3B is an exploded perspective view of part of an airbag configuring a front passenger seat airbag device according to the first exemplary embodiment.

Explanation follows regarding the bag structure of the head restraint portion 28H that is formed with the head contact face 34 and deploys in a recessed shape as described above. As illustrated in FIG. 3B, a portion of the center airbag 28 of the airbag 20 that configures the head restraint portion 28H is configured by stitching together three base cloths 36, 38, 40. The base cloth 36 includes a portion forming an upper wall 28U of the head restraint portion 28H. The base cloth 38 includes a portion forming a lower wall 28L of the head restraint portion 28H. The base cloth 40 includes a portion forming an outside wall 28So, the rear wall 28R mentioned above, and an inside wall 28Si forming the head contact face 34 of the head restraint portion 28H.

The base cloth 36 is formed with an outside edge 36So that has a straight line shape along the front-rear direction and to which is stitched an upper edge of a portion of the base cloth 40 forming the outside wall 28So, and formed with a rear edge 36R that has a straight line shape along the vehicle width direction and to which is stitched an upper edge of a portion of the base cloth 40 forming the rear wall 28R. The base cloth 36 is also formed with an inside edge 36Si that has a circular arc shape in plan view and to which is stitched an upper edge of a portion of the base cloth 40 forming the inside wall 28Si. In plan view, the inside edge 36Si matches or resembles the plan view shape of the head contact face 34 mentioned above.

The base cloth 38 is formed with an outside edge 38So that has a straight line shape along the front-rear direction and to which is stitched a lower edge of the portion of the base cloth 40 forming the outside wall 28So, and a rear edge 38R that has a straight line shape along the vehicle width direction and to which is stitched a lower edge of the portion of the base cloth 40 forming the rear wall 28R. The base cloth 38 is also formed with an inside edge 38Si that has a circular arc shape in plan view and to which is stitched a lower edge of the portion of the base cloth 40 forming the inside wall 28Si. In plan view, the inside edge 38Si matches or resembles the plan view shape of the head contact face 34 mentioned above.

The portion of the base cloth 40 forming the inside wall 28Si held between the circular arc shapes of the inside edges 36Si, 38Si of the upper and lower base cloths 36, 38, namely the head contact face 34, deploys in a circular arc shape in plan view, as described above. Note that auxiliary cloths, such as illustrated in the modified examples in FIG. 7A and FIG. 7B, may be employed in order to maintain the plan view circular arc shaped deployed shape of the head contact face 34 for each part of the head restraint portion 28H in the up-down direction.

Figure 7A:
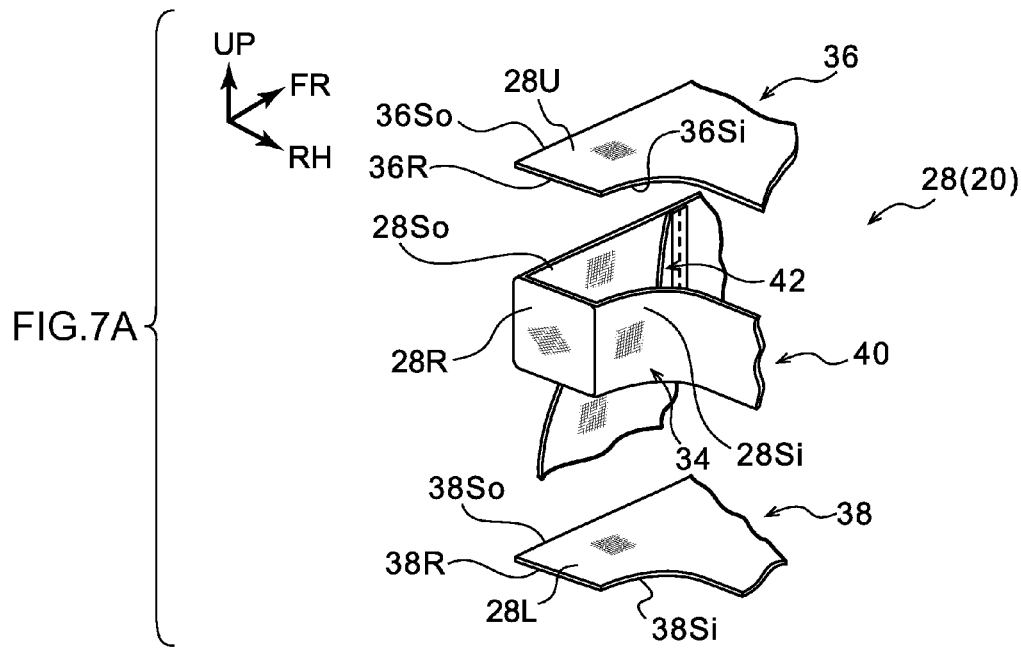
FIG. 7A is an exploded perspective view corresponding to FIG. 3B, illustrating a first modified example of an airbag configuring a front passenger seat airbag device according to the first exemplary embodiment.
Figure 7B:
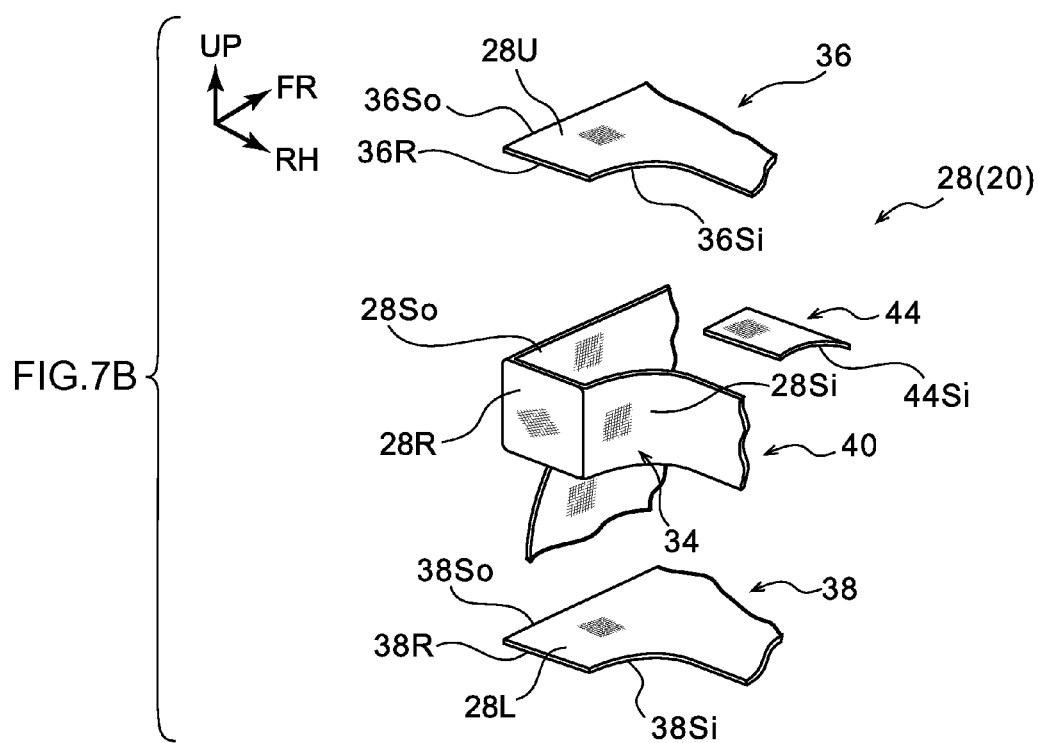
FIG. 7B is an exploded perspective view corresponding to FIG. 3B, illustrating a second modified example of an airbag configuring a front passenger seat airbag device according to the first exemplary embodiment.

An auxiliary cloth according to a first modified example illustrated in FIG. 7A is configured by a strap 42, with its width direction in the up-down direction, spanning between the outside wall 28So and the inside wall 28Si in the inflated and deployed state of the airbag 20. A front end side of the strap 42 is stitched to the outside wall 28So, and a rear end side of the strap 42 is stitched to the inside wall 28Si, such that tension restricts (an up-down direction center side of) the head contact face 34 from deploying so as to form a protrusion toward the side of the head H of the passenger P. An auxiliary cloth according to a second modified example illustrated in FIG. 7B is configured by a strap 44 stitched to a portion of the base cloth 40 forming the outside wall 28So, a portion of the base cloth 40 forming the rear wall 28R, and a portion of the base cloth 40 forming the inside wall 28Si, between the upper and lower base cloths 36, 38. An inside edge 44Si of the strap 44 is stitched to the portion of the base cloth 40 forming the inside wall 28Si, and is formed with a circular arc shape in plan view, similarly to the inside edges 36Si, 38Si of the base cloths 36, 38. The strap 44 holds (the up-down direction center side of) the head contact face 34 in the circular arc shape of the inside edge 44Si.

Operation

Explanation follows regarding operation of the present exemplary embodiment.

The airbag ECU 46 actuates the respective inflators 22 when a frontal collision to the vehicle V has been detected or predicted based on data from the collision sensor 48. When this is performed, the airbag 20 inflates and deploys on receipt of a supply of gas from the inflators 22, splitting open the airbag door set in the instrument panel 18. The front passenger seat airbag 26 accordingly inflates and deploys in front of the passenger P, this being the occupant of the vehicle seat 12, and the center airbag 28 inflates and deploys on the vehicle width direction center side of the front passenger seat airbag 26.

Full Overlap Frontal Collision

In the event of a frontal collision to the vehicle V being a full overlap frontal collision, the passenger P moves straight toward the front under inertia. Note that since the passenger P is wearing a three point seatbelt device, the movement mode of the passenger P toward the front is such that the upper body of the passenger P tilts forward about the waist. The passenger P moving toward the front then contacts the occupant contact face 30, and more specifically, the head H contacts the head contact face 30H, and the shoulder region S contacts the upper body contact face 30S, such that movement of the passenger P toward the front is restricted mainly by the front passenger seat airbag 26. Namely, the passenger P moving under inertia toward the front in a full overlap frontal collision is restrained by the front passenger seat airbag 26.

Oblique Collision or Small Overlap Collision on the Driving Seat Side

In the event of a frontal collision to the vehicle V being an oblique collision or a small overlap collision to the driving seat side (left side), the passenger P moves with respect to the vehicle body toward the left side, this being the collision side, in the vehicle width direction, while also moving toward the front, as illustrated by the arrow A in FIG. 1. Again, in such cases, the movement mode toward the front is one in which the passenger P wearing a three point seatbelt device tilts forward about the waist.

In such cases, the movement of the passenger P toward the collision side in the vehicle width direction while moving toward the front is restricted by the front passenger seat airbag 26 and the center airbag 28. In other words, the passenger P moving under inertia toward the collision side obliquely toward the front is restrained by the front passenger seat airbag 26 and the center airbag 28. This thereby enables better protection of the occupant in an oblique collision or a small overlap collision than a front passenger seat airbag device not provided with the center airbag 28.

Rotation of the head H of the passenger P mainly about an axis running in the up-down direction is also suppressed. Specific explanation follows, drawing comparison with Comparative Examples.

Head Rotation in Comparative Examples

Figure 5A:
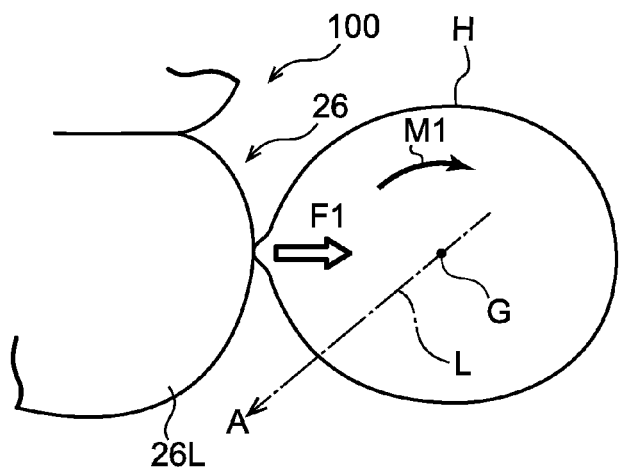
FIG. 5A is a schematic plan view to explain an action in which the head of an occupant rotates in a first Comparative Example.

A front passenger seat airbag device 100 illustrated in FIG. 5A is not provided with a center airbag. In this configuration, the head H of the passenger P moving toward the collision side obliquely toward the front contacts the left bag 26L of the front passenger seat airbag 26, and receives a rearward reaction force F1. A clockwise moment M1 to turn a rear portion of the head H toward the collision side, resulting from the difference between the direction of the reaction force and the movement direction of the head H, acts on the head H. In other words, forward movement of the head H is restricted at the location of contact with the left bag 26L, while inertia toward the oblique front (in the arrow A direction) continues to act on the center of gravity G of the head H due to the collision. The head H therefore rotates in a direction to displace the center of gravity G toward the collision side.

Figure 5B:
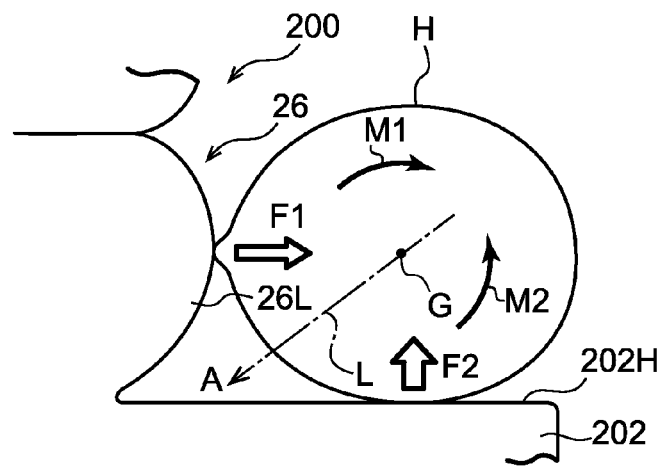
FIG. 5B is a schematic plan view to explain an action in which rotation of the head of an occupant is suppressed in a second Comparative Example.

A front passenger seat airbag device 200 illustrated in FIG. 5B is provided with the front passenger seat airbag 26 and a center airbag 202. A head contact face 202H of the center airbag 202 has a straight line shape extending along the front-rear direction in plan view. The head H that has contacted the head contact face 202H receives a reaction force F2 toward the collision-opposite side. A counterclockwise moment M2 to turn a rear portion of the head H toward the collision-opposite side, resulting from the difference between the direction of the reaction force and the movement direction of the head H, acts on the head H. Namely, the moment M2 acts in a direction cancelling out the moment M1 resulting from contact with the front passenger seat airbag 26. The front passenger seat airbag device 200 provided with the center airbag 202 is accordingly more capable of suppressing rotation of the head H of the passenger P than the configuration not provided with the center airbag 202.

Note that as described above, the movement angle α of the occupant is not the same in every oblique collision, and the movement angle α could be anywhere within a range of from 25° to 40°. In the front passenger seat airbag device 200, when the movement angle α is a small angle, the head H contacts the left bag 26L first, and when the movement angle α is a large angle, the head H contacts the head contact face 202H of the center airbag 202 first. There are concerns of being unable to adequately suppress rotation of the head H if a large time lag were to arise between the timings of the head H contacting the left bag 26L and contacting the center airbag 202.

Suppression of Head Rotation in the Present Exemplary Embodiment

In contrast thereto, in the front passenger seat airbag device 10, the head contact face 34 of the center airbag 28 deploys in a shape facing the rear and the vehicle width direction outside in plan view. In other words, the head contact face 34 faces the side of the head H prior to moving. The head contact face 34 accordingly contacts the head H so as to surround the center of gravity G from both sides (the front side and the collision side in the vehicle width direction) in plan view (reaching this contact state in a short space of time). Specifically, the head H is surrounded by the flexed head contact face 34, namely the head restraint portion 28H, on both sides of the straight line L connecting the positions of the center of gravity G before and after movement, as illustrated in FIG. 4. Rotation of the head H of the passenger P is accordingly suppressed.

Figure 5C:
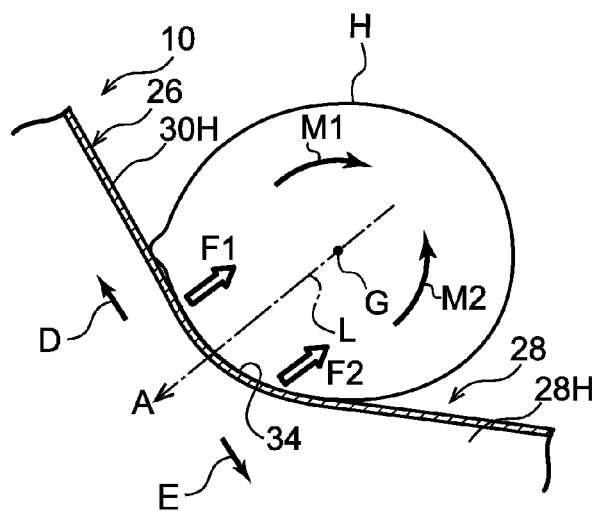
FIG. 5C is a schematic plan view cross-section to explain an action in which rotation of the head of an occupant is suppressed in the first exemplary embodiment.

Detailed explanation follows regarding this point, with reference to FIG. 5C. FIG. 5C is a schematic plan view cross-section illustrating the head contact face 34 (head restraint portion 28H) in a flexed state from contact with the head H of the passenger P moving obliquely toward the front left in an oblique collision or a small overlap collision of the vehicle V. In this state, the reaction force F1 acts on the head H of the passenger P at a portion of the head contact face 34 on the collision-opposite side (the arrow D direction side in FIG. 5C) of the straight line L. The clockwise moment M1 acts on the head H of the passenger P about the center of gravity G of the head H in plan view.

However, the reaction force F2 acts on the head H of the passenger P at a portion of the head contact face 34 on the collision side (the arrow E direction side in FIG. 5C) of the straight line L. The counterclockwise moment M2 accordingly acts on the head H of the passenger P about the center of gravity G of the head H in plan view. The moment M1 and the moment M2 acting on the head H of the passenger P accordingly act to cancel each other out (counteract each other). The head H of the passenger P can accordingly be restrained, while suppressing rotation of the head H of the passenger P moving obliquely toward the front left, in an oblique collision or a small overlap collision of the vehicle V. Note that the positions and directions of the reaction force F1 and the reaction force F2 illustrated in FIG. 5 are schematic.

The front passenger seat airbag device 10 enables rotation of the head H to be suppressed appropriately according to the movement angle α of the passenger P that differs depending on the collision mode. The present exemplary embodiment is capable of appropriately suppressing rotation of the head H of the passenger P as long as the movement angle α of the passenger P is within the range of from 25° to 40°.

In particular, prior to making contact with the head H, the head contact face 34 forms a curved shape with a recess open toward the side of the head H, thereby enabling the head H to be surrounded from both sides of the center of gravity G (straight line L) in a short time and over a broad range following contact of the head H. The front passenger seat airbag device 10 thereby enables rotation of the head H to be effectively suppressed. Moreover, the head contact face 34 forms a circular arc shape centered on the center of gravity G of the head H prior to moving. The head H is accordingly surrounded substantially uniformly on both sides of the straight line L, regardless of the movement angle α of the head H, as long as the movement angle α of the passenger P is within the range of from 25° to 40°. This thereby enables the front passenger seat airbag device 10 to suppress rotation of the head H even more effectively.

In the event of an oblique collision or a small overlap collision, the shoulder region S and the chest region B of the passenger P are restrained by the front passenger seat airbag 26 and the main body portion 28M of the center airbag 28 while the head H of the passenger P is restrained by the head restraint portion 28H, as illustrated in FIG. 6A and FIG. 6B. Note that since the occupant contact face 30 (head contact face 30H, upper body contact face 30S) and the upper body contact face 32 of the airbag 20 are positioned further to the front than the head contact face 34, the head H and shoulder region S of the passenger P are restrained (start to be restrained) at the same time as, or within an extremely short space of time, of each other. Energy due to the inertia of the passenger P is accordingly absorbed at the head H and the shoulder region S at the same time, thus even more effectively suppressing rotation of the head H.

Second Exemplary Embodiment

Explanation follows regarding a second exemplary embodiment of the present disclosure. Note that configuration and operation basically the same as in the first exemplary embodiment are allocated the same reference numerals as in the first exemplary embodiment, and explanation and illustration thereof may be omitted.

Figure 8:
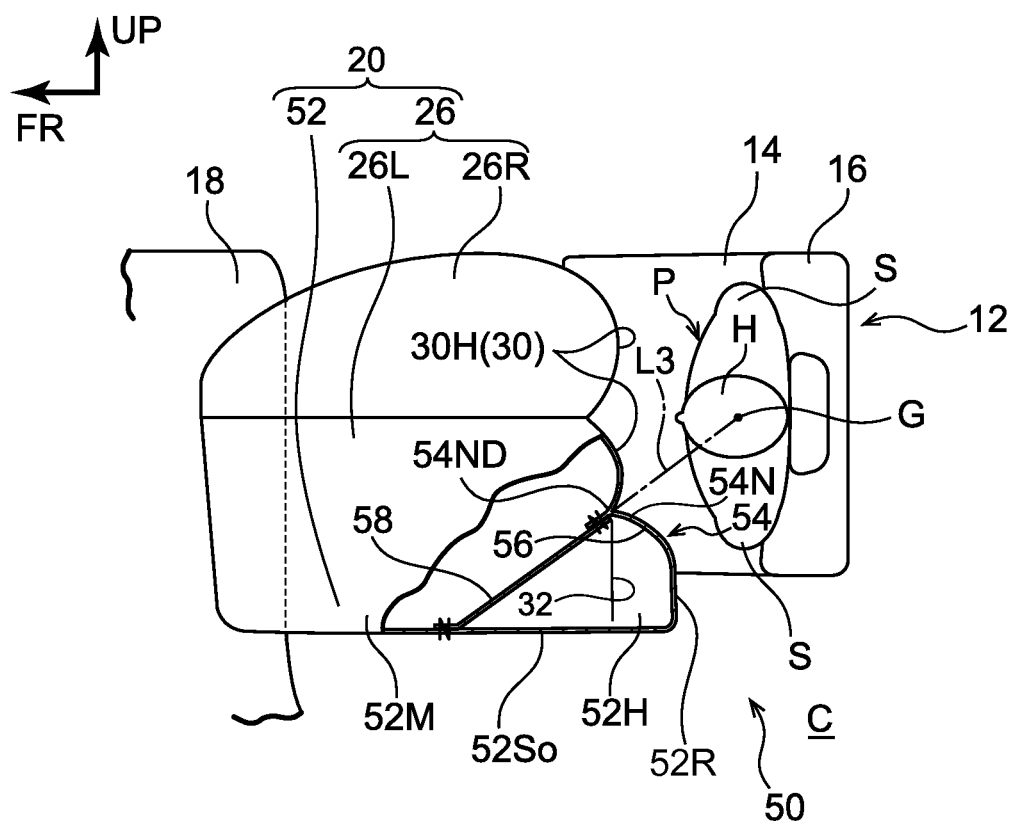
FIG. 8 is a plan view illustrating a schematic overall configuration of a front passenger seat airbag device according to a second exemplary embodiment.

FIG. 8 is a schematic plan view illustrating a front passenger seat airbag device 50 according to the second exemplary embodiment, with a portion cut away. As illustrated in FIG. 8, the front passenger seat airbag device 50 differs from the first exemplary embodiment in the provision of a center airbag 52 to the airbag 20, in place of the center airbag 28.

The center airbag 52 is configured including a main body portion 52M of similar configuration to the main body portion 28M of the center airbag 28 (having a similar shape when inflated and deployed), and a head restraint portion 52H projecting from an upper rear end of the main body portion 52M toward the rear. As described in detail later, a rear wall 52R, forming a rear end of the center airbag 52, configures a rear end of the head restraint portion 52H.

The head restraint portion 52H further includes a head contact face 54, serving as a second head contact face, facing the passenger P of the vehicle seat 12. A portion at a front end and vehicle width direction outside of the head contact face 54 is contiguous to the head contact face 30H formed by the left bag 26L of the front passenger seat airbag 26, and a rear end of the head contact face 54 reaches the rear wall 52R forming the rear end of the center airbag 52.

The head contact face 54 is a face (curved face) facing both the vehicle seat 12 side (vehicle width direction outside) and the rear. In plan view, a central portion of the head contact face 54 forms a nook face 54N recessed to form a nook open toward the side of the head H of the passenger P. Specifically, one end of a strap (or tether) 58, serving as a tension member, is connected to a portion of a base cloth 56 of the airbag 20 that forms an outside wall 52So of the main body portion 52M, and another end of the strap 58 is connected to an intermediate portion of a portion of the base cloth 56 that forms the head contact face 54. The head contact face 54 is thereby configured to deploy in a shape including the nook face 54N accompanying inflation and deployment of the airbag 20. The airbag 20 of the front passenger seat airbag device 50 therefore does not have the base cloth configuration illustrated in FIG. 3B, FIG. 7A, and FIG. 7B.

A maximum depth portion 54ND of the nook face 54N configures a connection portion with the strap 58, and an angle formed between a straight line L3 connecting together the maximum depth portion 54ND and the center of gravity G of the head H of the passenger P prior to moving due to a collision, and the center line CL, is set as an intermediate angle between 25° and 40° (for example, 32.5°). In the present exemplary embodiment, the strap 58 is configured to deploy (bear tension) along an extension line of the straight line L3 in plan view in the inflated and deployed state of the airbag 20. The center of gravity G of the head H prior to moving due to a collision may, for example, be set as the center of gravity of the head of a crash test dummy seated in the vehicle seat 12 in a standard sitting posture determined according to the testing method.

Other configurations of the front passenger seat airbag device 50, including portions not illustrated in the drawings, are similar to corresponding configurations in the front passenger seat airbag device 10. The front passenger seat airbag device 50 according to the second exemplary embodiment accordingly enables similar basic advantageous effects to be obtained from similar operation to the front passenger seat airbag device 10, with the exception of operation and advantageous effects due to forming the head contact face 34 in a circular arc shape forming a recess open toward the side of the passenger P in plan view.

The front passenger seat airbag device 50 enables the head contact face 54 to be formed (deployed) to suppress rotation of the head H in the event of an oblique collision or a small overlap collision by the simple configuration of joining together the base cloth 56 with the strap 58.

Modified Examples

In each of the exemplary embodiments described above, explanation has been given regarding examples in which the deployed shape of the head contact face 34, 54 of the center airbag 28 forms a recess open toward the side of the head H of the passenger P; however the present disclosure is not limited thereto. For example, the head contact face of the center airbag 28 may deploy in a straight line shape at an angle with respect to the front-rear direction in plan view, or may deploy in a shape protruding toward the side of the head H of the passenger P.

In each of the exemplary embodiments described above, explanation has been given regarding examples in which the head contact face 34, 54 is formed to the center airbag 28; however in the present disclosure, it is sufficient that at least a portion of the second head contact face is formed to the center airbag. Accordingly, for example, interpretation may be made in which a portion on the front side (center line CL side) of the head contact face 34, 54 is formed to the front passenger seat airbag 26.

In the exemplary embodiments described above, explanation has been given regarding examples in which the front passenger seat airbag 26 is a twin chamber type airbag; however the present disclosure is not limited thereto. For example, the front passenger seat airbag 26 may be a single chamber type airbag.

In each of the exemplary embodiments described above, explanation has been given regarding examples in which the movement angle α of the passenger P is set within a range of from 25° to 40°, and the head H of the passenger P contacts the head contact face 34, 54 within this range of the movement angle α. However, the present disclosure is not limited thereto. For example, the range of the movement angle α may be set to a different range, according to the vehicle make or specifications.

In each of the exemplary embodiments described above, explanation has been given regarding examples in which the front passenger seat airbag 26 and the center airbag 28 are formed as the airbag 20 in an integral bag shape. However, the present disclosure is not limited thereto. For example, the front passenger seat airbag 26 and the center airbag 28 may be formed as separate bag shapes, and integrated together by stitching or the like. In such a configuration, the front passenger seat airbag 26 and the center airbag 28 are in communication with each other at least at a front end side.

In the exemplary embodiments described above, explanation has been given regarding examples in which the two inflators 22 are actuated at substantially the same time as each other; however the present disclosure is not limited thereto. For example, configuration may be made with a single inflator, or configuration may be made such that the airbag ECU 46 actuates plural inflators with a specific time lag.

In the exemplary embodiments described above, explanation has been given regarding examples in which the center airbag 28 includes the upper body contact face 32 that deploys further to the front than the head contact face 34. However, the present disclosure is not limited thereto. For example, the center airbag may be configured projecting out further to the rear than the front passenger seat airbag 26 (occupant contact face 30) from an upper end to a lower end, or the center airbag may be configured including only the head restraint portion 28H, 52H (or missing a lower portion of the main body portion 28M, 52M).

Various other modifications may be implemented within a range not departing from the spirit of the present disclosure.

What is claimed is:

1. A front passenger seat airbag device comprising:
a front passenger seat airbag that receives a supply of gas and inflates and deploys in front of a front passenger seat, and that is formed with a vehicle rear-facing first head contact face at a vehicle up-down direction upper portion in an inflated and deployed state; and
a center airbag that is integrally formed with the front passenger seat airbag, that receives a supply of gas and inflates and deploys on a vehicle width direction center side of the front passenger seat airbag, and that is formed in an inflated and deployed state with a second head contact face extending from a vehicle width direction center side end portion of the first head contact face toward the vehicle rear and facing both the vehicle rear and the vehicle width direction outside.

2. The front passenger seat airbag device of claim 1, wherein:
the second head contact face has an arc shape forming a recess that is open toward the head of an occupant of the front passenger seat in plan view.

3. The front passenger seat airbag device of claim 1, wherein:
the second head contact face is formed in the inflated and deployed state of the center airbag, by connecting a plan view central portion of a base cloth at a portion forming the second head contact face with a portion of the center airbag further to the front side than the central portion, using a tension member.

4. The front passenger seat airbag device of claim 1, wherein:
the front passenger seat airbag and the center airbag are formed with an upper body contact face that is positioned further to the vehicle front than the second head contact face in the inflated and deployed state and that contacts at least the shoulder region of an occupant of the front passenger seat.

5. The front passenger seat airbag device of claim 2, wherein:
the front passenger seat airbag and the center airbag are formed with an upper body contact face that is positioned further to the vehicle front than the second head contact face in the inflated and deployed state and that contacts at least the shoulder region of the occupant of the front passenger seat.

6. The front passenger seat airbag device of claim 3, wherein:
the front passenger seat airbag and the center airbag are formed with an upper body contact face that is positioned further to the vehicle front than the second head contact face in the inflated and deployed state and that contacts at least the shoulder region of an occupant of the front passenger seat.

7. The front passenger seat airbag device of claim 1, wherein:
the front passenger seat airbag comprises an inner bag, that is adjacent to the center airbag, and an outer bag;
the inner bag and the outer air bag are configured to inflate and deploy so as to form a substantially left-right symmetrical shape in plan view; and
in the inflated and deployed state of the front passenger seat airbag, rear ends of the inner bag and the outer bag are positioned in front of respective corresponding shoulders of an occupant of the front passenger seat, and a nook formed between the rear ends of the inner bag and the outer bag is positioned in front of a head of the occupant.

8. The front passenger seat airbag device of claim 1, wherein the second head contact face of the center airbag is disposed at an angle within a range of from 25° to 40° with respect to a vehicle width direction center line of the front passenger seat.

9. The front passenger seat airbag device of claim 3, wherein, in the inflated and deployed state of the center airbag:
a plan view central portion of the second head contact face forms a nook face recessed to form a nook that opens toward a head of an occupant of the front passenger seat;
a maximum depth portion of the nook face configures a connection portion with the tension member; and
an angle formed between a straight line connecting together the maximum depth portion and the center of gravity of the head of the occupant prior to movement due to a collision, and a vehicle width direction center line of the front passenger seat, is within a range of from 25° to 40°.

10. The front passenger seat airbag device of claim 4, wherein:
the center airbag comprises a main body portion and a head restraint portion in the inflated and deployed state of the center airbag,
a front-rear direction position of a rear end face of the main body portion is substantially aligned with the front-rear direction position of the first head contact face,
the upper body contact face is formed at the main body portion, and
the head restraint portion projects out from an upper rear end of the main body portion.

11. The front passenger seat airbag device of claim 10, wherein:
the head restraint portion is formed with a bag structure in which an upper base cloth, a lower base cloth, and a side base cloth are stitched together,
the upper base cloth includes a portion forming an upper wall of the head restraint portion,
the lower base cloth includes a portion forming a lower wall of the head restraint portion, and
the side base cloth includes a portion forming an outside wall, a rear wall and an inside wall of the head restraint portion, the inside wall configuring the second head contact face.

12. The front passenger seat airbag device of claim 11, wherein:
the head restraint portion further includes a first auxiliary cloth,
a front end side of the first auxiliary cloth is stitched to the outside wall, and a rear end side of the first auxiliary cloth is stitched to the inside wall, and
in the inflated and deployed state of the center airbag, the first auxiliary cloth extends between the upper wall and the lower wall substantially along a vehicle up-down direction.

13. The front passenger seat airbag device of claim 11, wherein:
the head restraint portion further includes a second auxiliary cloth,
the second auxiliary cloth is stitched to the outside wall, the rear wall and the inside wall, and
in the inflated and deployed state of the center airbag, the second auxiliary cloth is extended within the head restraint portion on a plane substantially parallel to the upper wall and the lower wall.

* * * * *